March 9, 1948. F. W. MANNING 2,437,264
MAGAZINE SPINNING GUN FOR THE PRODUCTION OF FILAMENTS AND FABRICS
Filed Sept. 18, 1944
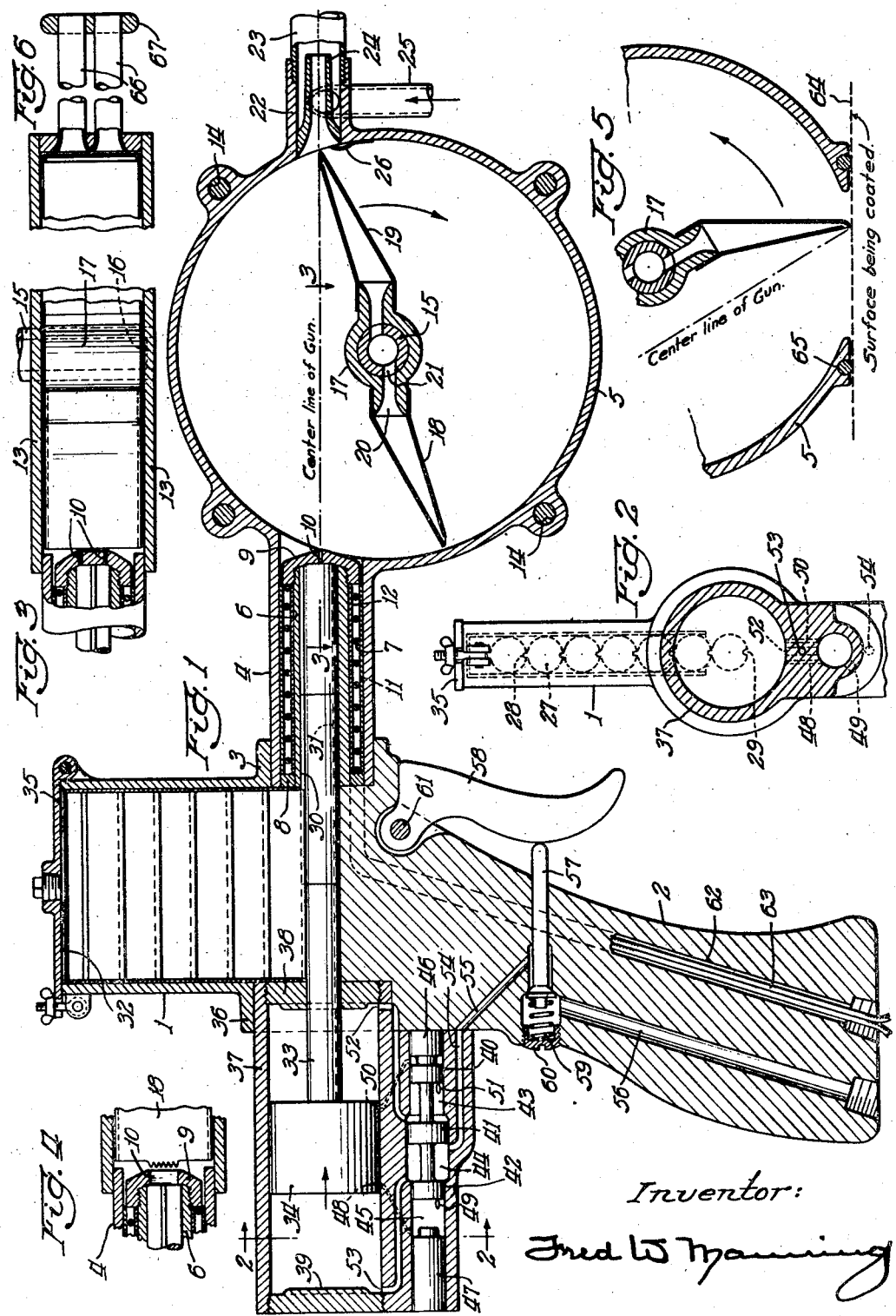
Inventor:
Fred W. Manning Patented Mar. 9, 1948

2,437,264

UNITED STATES PATENT OFFICE 2,437,264

MAGAZINE SPINNING GUN FOR THE PRODUCTION OF FILAMENTS AND FABRICS

Fred W. Manning, Palo Alto, Calif.

Application September 18, 1944, Serial No. 554,711

27 Claims. (Cl. 154—101)

My invention relates to devices for the production of filaments and fabrics, and particularly relates to magazine guns for such purposes. This application is a continuation-in-part of my copending application, Serial No. 504,525.

In the above-mentioned application I have described how filaments may be spun from a molten state by force of elastic and liquid fluids. It is a purpose of the present invention to provide a method and apparatus for stretch-orienting the molecular structure of the filaments to strengthen them, and then to deposit the filaments without loss of their stretch-orientation to form fabrics of comparatively great strength. Another object is to deposit the stretch-oriented filaments in continuous lines, and in a sufficiently plastic condition to adhere to one another to form an integral web. A further object is to incorporate a magazine in the handle, or other suitable location, of the gun for supplying the necessary spinning material. Other objects will become apparent from the following detailed description.

In accordance with my invention the filaments may be spun from the usual thermosetting and thermoplastic materials and combinations thereof: thermosetting compounds, such as urea-formaldehyde, phenol-formaldehyde, melamine-formaldehyde; thermoplastic resins, such as vinylidene chloride, vinyl chloride acetate, polyvinyl chloride, polyvinyl butyral, polystyrene, polysulphide, polyvinyl alcohol, polyvinyl acetate, methyl methacrylate, polymeric amides, the usual glass mixtures, latex compositions, cellulosic and petroleum derivatives, protein-base materials, etc.; mixtures of different thermoplastic resins, such as a mixture of a methacrylate resin and a polyvinyl acetal resin; plastics that are both thermoplastic and thermosetting, i. e., that become plastic under heat or/and pressure, and indurated under higher temperatures or/and greater pressures, or a continuation of the initial conditions of heat or/and pressure; plastic mixtures of thermoplastic and thermosetting materials, such as a mixture of a synthetic linear polyamide and a phenol-formaldehyde resin; plastic mixtures of organic and inorganic materials, such as the organic-silica combinations called "silicones"; and almost all substances that are now spun or extruded into filaments, films and foils. All such plastics may be modified by other materials, such plasticizers, catalyzing agents, volatile solvents, etc., to give the desired spinning characteristics and the required flexibility, extensibility, etc., to the finished products.

The plastic material may be reduced to a fluid spinning condition by heat, solvent, plasticizer, etc., and is then fed into a position where a reciprocating arm, rotary vane, or other suitable returnable means, may contact it and by adhesive adherence cause a finely divided portion of the material to be disrupted or drawn into a filament and the filament stretched to increase its molecular adhesion sufficiently for it to be propelled thereafter without breakage by a liquid or an elastic fluid. The movement of the fluid plastic into contact position may be accomplished by piston, plunger, air pressure, or similar means, acting on the plastic within a closed chamber having an extrusion orifice, which is preferably of reduced area to offer a certain amount of resistance to the fluid flow. If the size of the orifice, or plurality of orifices, is sufficiently small the extruded plastic fluid may be contacted and drawn into suitable filaments by means of a pulling device having a wide edge or surface; if the orifice is large the extruded fluid must be disrupted by filaments plucked therefrom and the initial size and shape of the filaments regulated by the size and shape of contacting teeth in a rotating or reciprocating comb, and the size of the filaments may then be further regulated by the rapidity and extent of the movement of the pulling action. After the filaments have been positively stretched a predetermined amount they may be removed from the pulling mechanism by various means, such as a doctor blade, force of a fluid stream which may be loaded with discrete solids to aid the removal, electrical heating to momentarily make the pulling teeth less adhesive, a stationary comb with non-adherent teeth meshing with the pulling teeth at an axial angle to lift the filaments from the latter, etc. A propulsion fluid used for motivating the pulling mechanism and disengaging the filaments therefrom after stretching has been accomplished may then be used to propel, additionally stretch, and deposit the filaments, and a secondary propulsion fluid can be used as the actuating force through an ejector to envelope and cooperate with the primary fluid for the same purposes. After the initial disruption of a plastic material into filaments and the stretching of the latter by a positive pulling action, movement of the pulling mechanism may sometimes be discontinued and the disruption and total stretching continued by action of the ejector alone. In such an arrangement the primary propelling fluid is drawn preferably through openings in the cover plates of a pulling chamber and maintained in a centralized position through the propulsion tubes by an enveloping secondary propulsion fluid from the ejector, the secondary fluid preferably moving at a greater speed than the primary fluid.

The ejector may also be used to coat and impregnate with discrete solids the filaments and the integral fabric formed by the deposition of the filaments in an adhesive intersecting condition. These solids may be conveyed into the propulsion tubes by either the primary or secondary propulsion fluid, and may consist of: fusible or binder smooth surface fibres, such as nylon, rayon, glass, etc.; natural fibres, such as cotton, wool, hair, feathers, asbestos, shredded leather, etc.; granular solids such as fuller's earth, diatomaceous earth, silica gel, etc. Integral fabrics are treated in this way to increase their warmth, improve their appearance, strengthen their structure, and for filtering and other refining purposes.

Oxidizing fluids, such as air, water and steam; non-oxidizing fluids, such as argon, helium, nitrogen, hydrogen, and carbon dioxide; quenching fluids, such as air, water and oil, may all be used for the purposes indicated. Ordinarily, it is preferable to maintain the filaments in a sufficiently plastic condition to adhere to one another so that when they are deposited in an intersecting condition an integral web will be formed, but when necessary, hot air, steam, solvent vapor, etc., may be used as, or incorporated in, the primary propulsion fluid for that purpose. However, if the filaments have become cured in the pulling chamber beyond the adhesive point, as for the purpose of cold-drawing, they may be brought back to the adhesive state during propulsion, or after deposition, by steam, hot air, solvent vapor, etc., being used as, or incorporated in, the secondary propulsion fluid. And in either arrangement the softening fluid, or fluids for other purposes, may pass through a foraminous filament retaining wall during formation of the integral fabric while the latter is being subjected to a positive pressure from a surface portion of the gun.

The invention is exemplified in the following description, and a preferred arrangement is illustrated by way of example in the accompanying drawings, in which:

Figure 1 is a vertical section of a gun for spinning purposes.

Figure 2 is a cross-section taken on line 2—2 of Figure 1.

Figure 3 is a horizontal section of a portion of the gun barrel and pulling chamber taken on line 3—3 of Figure 1.

Figure 4 is a modification of Figure 3 showing a rotary vane equipped with pulling teeth.

Figure 5 is a fragmentary vertical section of the pulling chamber shown in Figure 1, but in a modified form.

Figure 6 is a horizontal section of two propulsion tubes without ejectors, substituted for the one propulsion tube with ejector shown in Figure 1.

Referring to the drawings more specifically by reference characters: The magazine 1 is situated above the gun stock 2 of which it is an integral part. The forward flange 3 of the gun stock supports the pipe 4 of the pulling chamber 5, and enclosed within the pipe is the tube 6 which, with the lower portion of the magazine, forms the barrel of the gun; and situated between the pipe and tube is a heating element 7, sealing ring 8, and extrusion outlet 9 having orifices 10, the heating element being insulated from the pipe by asbestos covering 11 and from the tube by mica covering 12. Covers 13 are attached to the pulling chamber by bolts that pass through the holes 14, and support the fixed hollow shaft 15, which is closed at one end by plug 16. Outer shaft 17, which is equipped with two hollow vanes 18 and 19, is caused to rotate about the fixed shaft by fluid impulses on the vanes whenever openings 20 in the vane shaft and openings 21 in the fixed shaft become coincident, the opening in a vane being completely closed when the vane tip reaches the extrusion outlet but at its maximum when the filaments are about to be lifted from the tip. The pulling chamber has a filament outlet pipe 22 for a threaded propulsion tube 23, and is equipped with an ejector arrangement consisting of a suction nozzle 24 and a pressure fluid supply pipe 25 attached tangentially to the outlet pipe for creating the suction. A doctor blade 26 cooperates with the end of the pulling vanes for lifting filaments therefrom at the end of their positive stretch, a comb being substituted for the blade when the pulling is accomplished by teeth in the ends of the vanes. The plastic cartridges 27 have complementary male tongues 28 and female grooves 29 to engage with one another and with female grooves 30 and male tongues 31, respectively, in the gun barrel as the cartridges are fed into the heating zone. The cartridges are enclosed within a paper clip 32 from which the bottom end is strippped when the clip is inserted into the magazine, and as each cartridge is brought to a fluid condition under heat and extruded, the plunger 33 and piston 34 fly back and a fresh cartridge drops into position. The cover 35 is not required unless the magazine is charged with plastic in a fluid condition and extruded under air pressure, in which case the cover should be sufficiently tight to prevent escape of the fluid pressure. The rear flange 36 of the gun stock supports the propulsion cylinder 37, whose forward and rear ends are closed by end plates 38 and 39, respectively. The valve mechanism consists of a valve having forward, center and rear spools, 40, 41 and 42, respectively, which move in forward, center and rear valve chambers 43, 44 and 45, respectively, and the forward and rear chambers are closed by forward and rear plugs 46 and 47, respectively. The rear valve chamber is equipped with ports 48 and 49 leading to the cylinder and atmosphere, respectively; forward valve chamber, with ports 50 and 51 leading to the cylinder and atmosphere, respectively; and the center valve chamber, with ports 52 and 53 leading to the forward and rear ends of the cylinder, respectively, and also with a live air port 54 connecting with air passages 55 and 56 in the gun stock. A valve 57 regulates the flow of air between the two passages and is controlled by a pressure trigger 58, whose movement is opposed by the resistance of a spring 59 placed between the valve head and cap 60, a pin 61 being used to support the trigger. A second passage 62 is placed in the gun stock to serve as a duct for the wires 63, which lead to the heating element.

Figure 5 shows a modified arrangement of the pulling chamber shown in Figure 1, in which the filament outlet side of the casing has been cut away and the gun turned upside down, or what is preferable, the chamber has been turned over 180° in the gun stock, thereby placing the axis of the pulling vanes above the center of the gun, which makes it more convenient to deposit the filaments directly upon a foraminous surface 64 to be coated; and if pressure is to be exerted on the filaments during deposition the chamber, which is supported by rolls 65, can be shoved along the fabric as in ironing. Figure 6 shows an arrangement in which a propulsion tube 66 for each filament is substituted for the one ejector propulsion tube in Figure 1, which takes a plurality of filaments. The polished end piece 67 is used for ironing the fabric as the filaments are deposited.

The operation of the gun thus constructed has been in part indicated in connection with the foregoing description: The piston is shown in mid-position and moving forward under pressure of live air entering the rear of the cylinder through passage 54, center valve chamber 44, and passage 53, the exhaust escaping from the forward end of the cylinder through passage 52, forward valve chamber 43, and exhaust port 51. As the center spool 41 of the valve is larger in diameter than either of the end spools, the valve is held in the position shown until travel of the piston uncovers the reverse port 50, when air is admitted to the forward end of the valve. As the area of the forward spool is greater than the difference between the center and rear spools, the valve is thrown to the rear end of its stroke, and meanwhile the piston has reached the forward end of its travel and live air now enters the forward end of the cylinder through passage 54, center valve chamber 44, and passage 52, and the operation just described is reversed.

An inert primary propulsion fluid, which may be used as a quenching fluid at room temperature or lower, enters the fixed pipe 15 and is intermittently directed against the sides of the vanes, thereby inducing a continuous rotation of the vane shaft. In the position shown in Figure 1, a portion of the fluid escapes from the tip of vane 18 and an equalizing portion from the tip of vane 19, the latter division of the impelling fluid also serving to lift the stretching filaments from the vane tip and propel them into and through the propulsion tube 23. If the filaments have been cured beyond an adhesive condition, steam, heated air, or air conveying a solvent vapor, may enter ejector pipe 25 and return the filaments to an adhesive state before deposition. Or, after deposition the resulting fabric may be brought to an adhesive state by passing the softening fluid through the fabric and a foraminous retaining wall, and at the same time pressure may be exerted on the fabric by means of relative movements between the latter and an ironing fitting on the ends of the propulsion tubes, as shown in Figure 6. The ejector fluid, or secondary propulsion fluid, enters pipe 22 in a tangential direction, and thereby is given a swirling movement as it flows through propulsion tube 23, which will cause a plurality of filaments to twist about themselves to form a yarn. Either or both primary and secondary propulsion fluids may be used to stretch to the filaments, and the speed of the secondary fluid should be greater than that of the primary in order to prevent contact between the plastic filaments and the inner wall of the propulsion tube. In Figure 5, deposition is accomplished directly by using the flexible tip of the pulling vane to bring the stretched filaments into contact with a surface that offers greater adherence than the vane tip, as ordinarily would be the case when the filaments are brought by a metal tip into contact with a surgical pad to be coated.

It will be obvious from the foregoing description that filaments may be conveyed from a common pulling chamber into individual ejector tubes, or propulsion tubes without ejectors, and that they may be deposited by either elastic or liquid fluid propulsion in continuous parallel lines of filaments, and in sufficiently adhesive state to adhere to one another when relative movements of the gun and depositing surface cause them to intersect; or continuous filaments may be conveyed from the pulling chamber into the propulsion tubes and there disrupted into broken lengths by suitably directed blasts from either pulling vanes or ejector, and the broken lengths then dispersed and deposited in an adhesive and promiscuously intersecting condition to form an integral web; or filaments quenched and cured in the pulling chamber may be deposited in continuous parallel lines and then bonded in intersecting lines into an integral fabric by heat from the propulsion fluids and relative movements of the gun and depositing surface; or continuous filaments may be deposited directly in an adhesive state by the pulling vanes, and in parallel lines that may be made to intersect by relative movements of the gun and depositing surface. In all of the above instances the filament discharge surface of the gun, as shown in Fig. 5, or in Fig. 6, may be used to smooth and exert pressure on the filaments as they are deposited.

Furthermore, it will be evident that such a gun may be used in the making of threads by the wet process: A viscose solution, such as required in the manufacture of rayon, may be forced from the extrusion openings to be picked up by a pulling vane rotating counter-clockwise through a coagulating or precipitating bath of water, sulphuric acid and sodium sulphate. In this arrangement, the stretching chamber is turned 180° in the handle of the gun, thereby placing the axis of the pulling vanes above the center line of the gun and reversing the direction of rotation of the vanes. The distance between the two centers is then used to regulate the height of the precipitant, which may circulate through the chamber and propulsion tube as the motivating fluid for the pulling vanes and propelling fluid for the filaments, the filaments being led from the propulsion tubes to the usual godet wheel and the precipitant returning to motivate the vanes. Or, the inlet and outlet to the pulling chamber for the circulating precipitant may be through the cover plates, and the propulsion fluid used to remove the precipitant from the stretched filaments. Or, the circulating fluid may be a liquid used for quenching molten filaments during their stretching period, as, for instance, water at a room temperature of 60° used to quench polymeric amide or vinylidene chloride filaments extruded at a temperature of 320° F., which filaments, if reduced below the adhesive point, may be brought back thereto by a higher temperatured propulsion fluid.

It also will be evident that a magazine spinning gun can be used to form and deposit filaments by the dry spinning process: A viscous material, which may be polyvinyl alcohol in a water solvent, cellulose acetate in an acetone solvent, or other spinning solution, may be introduced into the magazine and under either plunger or elastic fluid pressure extruded through outlet openings in the end of the gun barrel to be picked up by a pulling vane and deposited as above described, the solvent being removed from the filaments by an evaporative fluid used as either primary or secondary propulsion fluid.

Furthermore, it will be evident that: filaments spun from melt, such as nylon, may be quenched beyond the adhesive point during stretching by a primary propulsion elastic fluid, which contains a phenol vapor or other softening agent to bring them back to an adhesive condition; the solvent-treated filaments coated by a secondary propulsion fluid containing an aqueous dispersion of rubber, or rubber-like material; the coated filaments deposited simultaneously in mixture, or in alternate layers, with discrete fibres of shredded leather; the resulting fabric cured by evaporation of the solvent; and the indurated fabric then vulcanized to a solid rubber composition. Thus, a tire may receive a vulcanized coating of shredded leather bonded by a plurality of integral nylon filaments or fabrics of great tensile strength, the shredded leather being obtained from scrap now sold as fertilizer.

It again will be evident that the disruption of a molten or other fluid plastic may result from the extrusion of the fluid through fine spinneret-like openings, and that the extruded divisions may be picked up and drawn into filaments by a pulling means having a tooth for each division or a uniform edge or surface for all the divisions; or the disruption may result from the plucking of filaments from a fluid plastic mass by means of contact between the mass and the ends of the teeth of a pulling means during which the mass may be moving through an extrusion outlet or held stationary within a container. In either case, if the pulling means is maintained in continuous operation, it must return repeatedly for fresh contacts with the fluid plastic, and each contact will result in the formation of a fresh filament or a further extension of the original filament. If a fresh filament is formed, one arm of the pulling means will be used for stretching, and one end of the oriented filament will be lifted therefrom before the other end is sheared from the extruded division by a secondary arm of the pulling means.

I claim as my invention:

1. The method of making a non-woven fabric from a fluid plastic comprising: disrupting the said plastic into finely divided portions; positively pulling the said portions a predetermined amount to produce a plurality of stretch-oriented filaments of substantial length; propelling the said filaments by force of a fluid stream to deposit the filaments; and maintaining the said filaments during the said fluid propulsion in a sufficiently adhesive condition to adhere to one another upon deposition.

2. The method of making a non-woven fabric from a fluid plastic comprising: disrupting the said plastic into finely divided portions; positively pulling the said portions a predetermined amount to produce a plurality of stretch-oriented filaments of substantial length; propelling the said filaments by a blast of elastic fluid to convey and deposit the filaments; and maintaining the said filaments during the said fluid propulsion in a sufficiently adhesive condition to adhere to one another upon deposition.

3. The method of producing filaments from a fluid plastic comprising: disrupting the said plastic into finely divided portions; positively pulling the said portions a predetermined amount to produce a plurality of stretch-oriented filaments under tension; severing the tensioned filaments at regular intervals to produce a plurality of filaments of predetermined length; and propelling the severed filaments by force of a fluid stream to deposit the filaments.

4. The method of making a non-woven fabric from a fluid plastic comprising: disrupting the said plastic into finely divided portions; positively pulling the said portions a predetermined amount to produce a plurality of stretch-oriented filaments; severing the said filaments at regular intervals to produce a plurality of filaments of predetermined length; propelling the severed filaments by force of a fluid stream to deposit the filaments; and maintaining the said filaments during the said fluid propulsion in a sufficiently adhesive condition to adhere to one another upon deposition.

5. The method of producing filaments from a fluid plastic comprising: disrupting the said plastic into finely divided portions; positively pulling the said portions a predetermined amount to produce a plurality of stretch-oriented filaments; propelling the said filaments by force of a fluid stream to deposit the filaments; and repeating the said disrupting pulling and propulsion operations on successive portions of the said fluid plastic to produce a plurality of stretch-oriented filaments of substantial length.

6. The method of making a non-woven fabric from a fluid plastic comprising: disrupting the said plastic into finely divided portions; positively pulling the said portions a predetermined amount to produce a plurality of stretch-oriented filaments; propelling the said filaments by force of a fluid stream to deposit the filaments; and maintaining the said filaments during the said fluid propulsion in a sufficiently adhesive condition to adhere to one another upon deposition without loss of their stretch-orientation.

7. The method of making a non-woven fabric from a fluid plastic comprising: disrupting the said plastic into finely divided portions; positively pulling the said portions a predetermined amount to produce a plurality of stretch-oriented filaments; propelling the said filaments by force of a fluid stream moving in a controlled path; introducing a treating agent into the said stream during the said propulsion to make the said filaments adhesive, and depositing the treated filaments so as to intersect and adhere to one another without loss of their stretch-orientation.

8. The method of making a non-woven fabric from a fluid plastic comprising: disrupting the said plastic into finely divided portions; positively pulling the said portions a predetermined amount to produce a plurality of stretch-oriented filaments; propelling the said filaments by force of a fluid stream moving in a controlled path; introducing discrete solids into the said fluid stream to intermingle with the said filaments; and depositing the said intermingled solids and filaments to form a web in which the said solids are bonded by the said filaments.

9. The method of making a non-woven fabric from a fluid plastic comprising: disrupting the said plastic into finely divided portions; positively pulling the said portions a predetermined amount to produce a plurality of stretch-oriented filaments; propelling the said filaments by force of a fluid stream moving in a controlled path; introducing discrete natural fibres into the said fluid stream to intermingle with the said filaments; and depositing the said intermingled fibres and filaments to form a web in which the said fibres are bonded by the said filaments.

10. The method of making a non-woven fabric from a fluid plastic comprising: disrupting the said plastic into finely divided portions; positively pulling the said portions a predetermined amount to produce a plurality of stretch-oriented filaments; propelling the said filaments by force of a fluid stream moving in a controlled path; introducing discrete natural fibres into the said fluid stream to intermingle with the said filaments; depositing the said intermingled fibres and filaments to form a web; and subjecting the said web to heat and pressure whereby the said fibres are bonded by the said filaments.

11. The method of making a non-woven fabric from a plastic material comprising: reducing the said material to a molten fluid; disrupting the said fluid plastic into finely divided portions; positively pulling the said portions a predetermined amount to produce a plurality of stretch-oriented filaments; propelling the said filaments by force of a fluid stream moving in a controlled path to deposit the filaments; and maintaining the said filaments during the said propulsion in a sufficiently adhesive condition to adhere to one another upon deposition without loss of their stretch-orientation.

12. The method of making a non-woven fabric from a plastic material comprising: reducing the said material to a molten fluid; disrupting the said fluid plastic into finely divided portions; positively pulling the said portions a predetermined amount to produce a plurality of stretch-oriented filaments under tension; severing the tensioned filaments at regular intervals to produce a plurality of filaments of predetermined length; propelling the severed filaments by force of a fluid stream moving in a controlled path to deposit the filaments; and maintaining the severed filaments during the said propulsion in a sufficiently adhesive condition to adhere to one another upon deposition and without loss of their stretch-orientation.

13. In a spinning device, the combination of: an enclosure; a plastic supply chamber; an orifice connecting the said enclosure and said chamber; means for feeding a plastic material from the said chamber and extruding it through the said orifice into the said enclosure; positive pulling means within the said enclosure cooperating with the said orifice for forming a filament from the said extruded material and stretching it a predetermined amount; means for removing the said filament from the said pulling means; and means for supplying a fluid stream to propel the said filament from the said enclosure.

14. In a spinning device, the combination of: an enclosure; a plastic supply chamber; an orifice connecting the said enclosure and the said chamber; means for feeding a plastic material from the said chamber and extruding it through the said orifice into the said enclosure; positive pulling means within the said enclosure cooperating with the said orifice for forming a filament from the said extruded material and stretching it a predetermined amount; and means for supplying an elastic fluid for removing the said filament from the said enclosure.

15. In a spinning device, the combination of: an enclosure; a plastic supply chamber; an orifice connecting the said enclosure and said chamber; means for feeding a plastic material from the said chamber and extruding it through the said orifice into the said enclosure; positive pulling means within the said enclosure cooperating with the said orifice for forming a filament from the said extruded material and stretching it a predetermined amount at a given speed; and means for supplying an elastic fluid moving at a greater than the said given speed for removing the said filament from the said enclosure.

16. In a spinning device, the combination of: a cartridge magazine; an enclosure; a cylinder having a piston therein; a barrel adjacent to the said magazine having an inlet and an extrusion outlet and connecting the said enclosure to the said cylinder; a heating element for the said barrel to reduce a cartridge to a molten condition; means for moving the said piston to cause a cartridge to be fed from the said magazine into the said barrel and a molten portion of a cartridge within the barrel to be extruded from the barrel into the said enclosure; positive pulling means within the said enclosure for attenuating the said molten portion into filaments and stretching them a predetermined amount; and means for supplying an elastic fluid for removing the said filaments from the said enclosure.

17. In a magazine spinning gun, the combination of: a cartridge magazine; an enclosure; a barrel having an extrusion outlet connected to the said enclosure and an inlet connected to the said magazine; a heating element adjacent to the said barrel to reduce a cartridge within the barrel to a molten condition; a feeding mechanism adjacent to the magazine end of the barrel; means for operating the said mechanism whereby a cartridge from the said magazine is introduced into the said barrel and fed forward in the barrel, and a molten portion of a cartridge within the barrel is extruded from the barrel into the said enclosure; positive pulling means within the said enclosure for attenuating the said molten portion into filaments and stretching them a predetermined amount; and means for supplying an elastic fluid for removing the said filaments from the said enclosure.

18. In a magazine spinning gun, the combination of: a cartridge magazine; an enclosure; a barrel having an extrusion outlet connected to the said enclosure and an inlet connected to the said magazine; a heating element adjacent to the said barrel to reduce a cartridge within the barrel to a molten condition; a cartridge guiding means within the said barrel; a feeding mechanism adjacent to the magazine end of the barrel; means for operating the said mechanism whereby a cartridge from the said magazine is introduced into the said barrel and fed forward in the barrel in engagement with the said guiding means, and a molten portion of a cartridge within the barrel is extruded from the barrel into the said enclosure; positive pulling means within the said enclosure for attenuating the said molten portion into filaments and stretching them a predetermined amount; and means for supplying an elastic fluid for removing the said filaments from the said enclosure.

19. The method of making a non-woven fabric from a plastic material comprising: reducing the said material to a molten fluid; disrupting the said fluid plastic into finely divided portions; positively pulling the said portions a predetermined amount to produce a plurality of stretch-oriented filaments; propelling the said filaments by force of a fluid stream moving in a controlled path; introducing a treating agent into the said stream during the said propulsion to make the said filaments adhesive; and passing the said stream through a foraminous retaining wall to deposit the said filaments in an integral web of stretch-oriented filaments thereupon.

20. The method of making a non-woven fabric from a fluid plastic comprising: disrupting the said plastic into finely divided portions; positively pulling the said portions a predetermined amount to produce a plurality of stretch-oriented filaments; propelling the said filaments by force of a fluid stream moving in a controlled path; passing the said stream through a foraminous retaining wall to deposit the said filaments in an intersecting condition thereupon; and bonding the said deposited filaments to form an integral web of stretch-oriented filaments.

21. The method of making a non-woven fabric from a fluid plastic comprising: disrupting the said plastic into finely divided portions; positively pulling the said portions a predetermined amount to produce a plurality of stretch-oriented filaments; propelling the said filaments by force of a fluid stream moving in a controlled path; introducing a treating agent into the said stream during the said propulsion to make the said filaments adhesive; and passing the said stream through a foraminous retaining wall to deposit the said filaments in an intersecting and sufficiently adhesive condition to form an integral web of stretch-oriented filaments.

22. The method of making a non-woven fabric from a fluid plastic comprising: disrupting the said plastic into finely divided portions; positively pulling the said portions a predetermined amount to produce a plurality of stretch-oriented filaments; propelling the said filaments by force of a fluid stream moving in a controlled path; passing the said stream through a foraminous retaining wall to deposit the said filaments in an intersecting condition thereupon; and passing a treating fluid through the said deposited filaments and wall to bond the filaments at their said intersections and form an integral web of stretch-oriented filaments.

23. The method of making a non-woven fabric from a fluid plastic comprising: disrupting the said plastic into finely divided portions; positively pulling the said portions a predetermined amount to produce a plurality of stretch-oriented filaments; propelling the said filaments by force of a fluid stream moving in a controlled path; passing the said stream through a foraminous retaining wall to deposit the said filaments in an intersecting condition thereupon; and coating the deposited filaments with an impregnant to bond the said intersections and form an integral web of stretch-oriented filaments.

24. The method of making a non-woven fabric from a plastic material comprising: reducing the said material to a molten fluid; disrupting the said fluid plastic into finely divided portions; positively pulling the said portions a predetermined amount to produce a plurality of stretch-oriented filaments; propelling the said filaments by force of a fluid stream moving in a controlled path; passing the said stream through a foraminous retaining wall to deposit the said filaments in an intersecting condition thereupon; and bonding the said deposited filaments to form an integral web of stretch-oriented filaments.

25. The method of making a composite fabric from a fluid plastic comprising: disrupting the said plastic into finely divided portions; positively pulling the said portions a predetermined amount to produce a plurality of stretch-oriented fusible fibres; propelling the said fibres by force of a fluid stream moving in a controlled path; introducing non-fusible fibres into the said stream to intermingle with the said fusible fibres during the said propulsion; passing the said stream through a foraminous retaining wall to deposit the said mixed fibres thereupon; and subjecting the said deposited fibres to heat and pressure to form an integral web of non-fusible and stretch-oriented, fusible fibres.

26. The method of making a composite fabric from a fluid plastic comprising: disrupting the said plastic into finely divided portions; positively pulling the said portions a predetermined amount to produce a plurality of stretch-oriented fusible fibres; propelling the said fibres by force of a fluid stream moving in a controlled path; introducing non-fusible fibres into the said stream to intermingle with the said fusible fibres during the said propulsion; passing the said stream through a foraminous retaining wall to deposit the said mixed fibres thereupon; and bonding the said deposited non-fusible fibres by the said deposited fusible fibres to form an integral web of non-fusible and stretch-oriented fusible fibres.

27. The method of making a composite fabric from a fluid plastic comprising: disrupting the said plastic into finely divided portions; positively pulling the said portions a predetermined amount to produce a plurality of stretch-oriented filaments; propelling the said filaments by force of a fluid stream moving in a controlled path; introducing discrete solids into the said stream to intermingle with the said filaments during the said propulsion; passing the said stream through a foraminous retaining wall to deposit the said solids and filaments thereupon; and bonding the said deposited solids by the said deposited filaments to form an integral web of solids and stretch-oriented filaments.

FRED W. MANNING.

REFERENCES CITED

The following references are of record in the file of this patent:

UNITED STATES PATENTS

| Number | Name | Date |
|---|---|---|
| 1,949,604 | Dreyfus et al. | Mar. 6, 1934 |
| 1,975,504 | Formhals | Oct. 2, 1934 |
| 2,116,942 | Formhals | May 10, 1938 |
| 2,036,838 | Taylor | Apr. 7, 1936 |
| 2,067,251 | Taylor | Jan. 12, 1937 |
| 2,168,027 | Gladding | Aug. 1, 1939 |
| 2,173,789 | Nikles et al. | Sept. 19, 1939 |
| 2,253,089 | Nydegger | Aug. 19, 1941 |
| 2,290,929 | Whitehead | July 28, 1942 |
| 2,274,130 | Davis | Feb. 24, 1942 |
| 2,357,392 | Francis, Jr. | Sept. 5, 1944 |
| 2,374,540 | Hall | Apr. 24, 1945 |